(12) United States Patent
Kim et al.

(10) Patent No.: US 10,229,345 B2
(45) Date of Patent: Mar. 12, 2019

(54) APPARATUS AND METHOD FOR PROCESSING TEXTURED IMAGE

(71) Applicant: Electronics and Telecommunications Research Institute, Daejeon (KR)

(72) Inventors: Min-Kyu Kim, Daejeon (KR); Jeong-Mook Lim, Daejeon (KR); Hee-Sook Shin, Daejeon (KR); Chang-Mok Oh, Daejeon (KR); Hyun-Tae Jeong, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 104 days.

(21) Appl. No.: 15/397,442

(22) Filed: Jan. 3, 2017

(65) Prior Publication Data
US 2017/0193332 A1    Jul. 6, 2017

(30) Foreign Application Priority Data

Jan. 5, 2016    (KR) .................. 10-2016-0001041

(51) Int. Cl.
G06K 9/00    (2006.01)
G06K 9/62    (2006.01)
(Continued)

(52) U.S. Cl.
CPC ......... G06K 9/6222 (2013.01); G06K 9/4619 (2013.01); G06K 9/6223 (2013.01);
(Continued)

(58) Field of Classification Search
None
See application file for complete search history.

(56) References Cited

U.S. PATENT DOCUMENTS 5,825,909 A * 10/1998 Jang .................... G06T 7/11
                                                    382/132
6,631,212 B1    10/2003 Luo et al.
(Continued)

OTHER PUBLICATIONS

Chebbout et al., "An Object Segmentation Method Based on Saliency Map and Spectral Clustering", 2015 World Congress on Information Technology and Computer Applications Congress (WCITCA), Jun. 11-13, 2015, pp. 1-9.*

Primary Examiner — Matthew C Bella
Assistant Examiner — Jose Torres

(57) ABSTRACT

Disclosed herein are an apparatus and method for processing a textured image. The apparatus includes a filter unit for detecting an edge of an input image and transforming the input image into an image in which a density of the edge is represented; a smoothing unit for removing noise from the transformed image and smoothing the image; a clustering unit for changing a number of regions into which the smoothed image is to be segmented and clustering the smoothed image a preset number of times; and a cluster optimization unit for setting a final number of clusters for the input image by optimizing a number of clusters based on a previously learned ground truth, for selecting an image corresponding to the final number of clusters from results of clustering by which the image is segmented into a different number of regions, and for outputting the selected image.

13 Claims, 6 Drawing Sheets

(51) Int. Cl.
  *G06T 7/44*  (2017.01)
  *G06T 7/11*  (2017.01)
  *G06T 7/13*  (2017.01)
  *G06T 5/00*  (2006.01)
  *G06T 5/20*  (2006.01)
  *G06K 9/46*  (2006.01)
  *G06T 7/143* (2017.01)

(52) U.S. Cl.
  CPC ............ G06K 9/6231 (2013.01); G06T 5/002 (2013.01); G06T 5/20 (2013.01); G06T 7/11 (2017.01); G06T 7/13 (2017.01); G06T 7/143 (2017.01); G06T 7/44 (2017.01); *G06T 2207/20076* (2013.01); *G06T 2207/20081* (2013.01)

(56) References Cited

U.S. PATENT DOCUMENTS

| | | | |
|---|---|---|---|
| 7,058,209 B2 * | 6/2006 | Chen | G06K 9/00281 382/117 |
| 2009/0148010 A1 * | 6/2009 | Boroczky | G06K 9/3233 382/128 |
| 2009/0175514 A1 * | 7/2009 | Zhao | G06K 9/6228 382/128 |
| 2011/0123076 A1 | 5/2011 | Choi | |
| 2012/0051423 A1 | 3/2012 | Hong | |
| 2016/0026889 A1 * | 1/2016 | Parkhomenko | G06K 9/40 382/199 |

* cited by examiner (a)  (b)  (c)  (d)

APPARATUS AND METHOD FOR PROCESSING TEXTURED IMAGE

CROSS REFERENCE TO RELATED APPLICATION

This application claims the benefit of Korean Patent Application No. 10-2016-0001041, filed Jan. 5, 2016, which is hereby incorporated by reference in its entirety into this application.

BACKGROUND OF THE INVENTION

1. Technical Field

The present invention relates to an apparatus and method for processing a textured image.

2. Description of the Related Art

Clustering an image that includes a texture requires prior learning. Here, in the case of unsupervised learning, because only the number of clusters is defined without other preconceptions about clustering, it is important to accurately define the number of clusters.

Here, there are two commonly used methods for setting the number of clusters.

The first method is one in which a person directly sets the number of clusters, and the second method is one in which an algorithm is performed on different numbers of clusters multiple times and the number of clusters is optimized by comparing the standard deviation of data in each of the clusters with the distance between the clusters.

In the case of the first method, because a person directly sets the number of clusters, the number may be accurate, but efficiency may decrease with an increase in the amount of data to be processed. In the case of the second method, because clustering must be performed multiple times, it is difficult to quickly set the number of clusters.

Documents of Related Art (Patent Document 1) U.S. Pat. No. 6,631,212.

SUMMARY OF THE INVENTION

An object of the present invention is to provide an apparatus and method for processing a textured image by which the number of clusters is quickly and accurately set when segmentation of a textured image is performed, whereby segmentation may be performed using a number of clusters that is optimized to the corresponding textured image.

Technical objects of the present invention are not limited to the above-mentioned object, and other technical objects that have not been mentioned may be clearly understood by those skilled in the art from the following description.

In order to accomplish the above object, an apparatus for processing a textured image according to the present invention includes a filter unit for detecting an edge of an input image and transforming the input image into an image in which a density of the edge is represented using information about the detected edge; a smoothing unit for removing noise from the transformed image and then smoothing the image; a clustering unit for performing, a preset number of times, changing a number of regions into which the smoothed image is to be segmented and clustering the smoothed image; and a cluster optimization unit for determining a final number of clusters for the input image by optimizing a number of clusters for the input image based on a previously learned ground truth, for selecting a resultant image corresponding to the final number of clusters from among results of clustering by which the image is segmented into a different number of regions, and for outputting the selected resultant image.

The cluster optimization unit may determine the number of clusters corresponding to any one of the results of clustering based on an energy value for each of clusters of the image segmented as a result of clustering, and may optimize a weight corresponding to the determined number of clusters.

The cluster optimization unit may set a condition for a weight to be compared with a result of previous learning on the result of clustering, calculate the energy value for each of the clusters based on the set condition, and set the number of clusters to a value that enables a weighted sum of the energy values to become a minimum value.

The cluster optimization unit may optimize the weight by comparing the determined number of clusters with the number of clusters in the previously learned ground truth.

The cluster optimization unit may calculate the weight so as to maximize a matching value between the determined number of clusters and the number of clusters in the previously learned ground truth.

The cluster optimization unit may perform a matching between an XOR function value for the determined number of clusters and an XOR function value for another number of clusters which is arbitrarily selected, and calculate the weight so as to maximize a difference of the matching.

The cluster optimization unit may determine the final number of clusters based on the optimized weight.

Meanwhile, in order to accomplish the above object, a method for processing a textured image according to the present invention includes detecting an edge of an input image and transforming the input image into an image in which a density of the edge is represented using information about the detected edge; removing noise from the transformed image and then smoothing the image; performing, a preset number of times, changing a number of regions into which the smoothed image is to be segmented and clustering the smoothed image; determining a final number of clusters for the input image by optimizing a number of clusters for the input image based on a previously learned ground truth; and selecting a resultant image corresponding to the final number of clusters from among results of clustering performed the preset number of times and outputting the selected resultant image.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
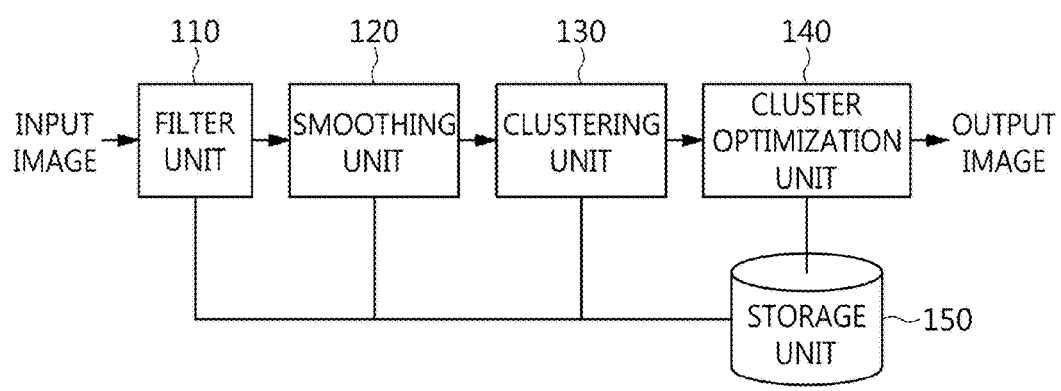
FIG. 1 is a view that shows the configuration of an apparatus for processing a textured image according to the present invention.

Hereinafter, some embodiments of the present invention will be described in detail with reference to exemplary drawings. Reference should now be made to the drawings, in which the same reference numerals are used throughout the different drawings to designate the same or similar components. In the following description, it is to be noted that, when the functions of conventional elements and the detailed description of elements related with the present invention may make the gist of the present invention unclear, a detailed description of those elements will be omitted.

It will be understood that, although the terms "first," "second," "A," "B," "(a)," "(b)," etc. may be used herein to describe various elements, these terms are only used to distinguish one element from another element, and the essentials or the order of these elements should not be limited by these terms. When a first element is described as being "connected," "combined," or "coupled" to a second element, it should be understood that the first element may be directly connected or coupled to the second element, or that another element may alternatively be "connected," "combined" or "coupled" therebetween.

FIG. 1 is a view that shows the configuration of an apparatus for processing a textured image according to the present invention.

Referring to FIG. 1, the apparatus for processing a textured image may include a filter unit 110, a smoothing unit 120, a clustering unit 130, a cluster optimization unit 140 and a storage unit 150.

First, the filter unit 110 serves to filter an input image and to thereby transform the input image into an image that satisfies the filtering condition.

Here, the filter unit 110 may include a filter for detecting the edge of the input image, such as Gabor filter or the like. In this case, the filter unit 110 may detect the edge of the input image using the filter and transform the input image into an image in which the density of the edge is represented using information about the detected edge. The image transformed by the filter unit 110 may be delivered to a smoothing unit 120.

When the image in which the density of the edge is represented is input from the filter unit 110, the smoothing unit 120 smooths the input image and delivers the image to the clustering unit 130. Here, the smoothing unit 120 may include a filter for removing noise, such as a Gaussian filter or the like. Here, the smoothed image has a smoother texture because the standard deviation of pixel values is reduced compared to the input image.

When the smoothed image is input from the smoothing unit 120, the clustering unit 130 serves to segment the corresponding image based on a preset condition, for example, the number of times that clustering is to be performed, the number of regions into which the image is to be segmented, and the like. Here, the number of regions into which the image is to be segmented may be set based on the density of the edge detected by the filter unit 110.

The clustering unit 130 may perform clustering on the smoothed image the preset number of times. Here, the clustering unit 130 performs clustering twice or more. Here, the clustering unit 130 may vary the numbers of regions into which the image is to be segmented and perform clustering the preset number of times.

When clustering of the smoothed image has been completed the preset number of times, the clustering unit 130 delivers the result of clustering to the cluster optimization unit 140.

The cluster optimization unit 140 calculates a weight that corresponds to a reference for setting the final number of clusters, and sets the final number of clusters based on the calculated weight.

First, the cluster optimization unit 140 may perform learning using multiple similar images. Here, the results of learning performed by the cluster optimization unit 140 are stored in the storage unit 150, and may be loaded when calculating a weight and setting the number of clusters. The cluster optimization unit 140 may set a weight for setting the final number of clusters based on the result of learning, which is performed using images that are similar to the input image.

Figure 2:
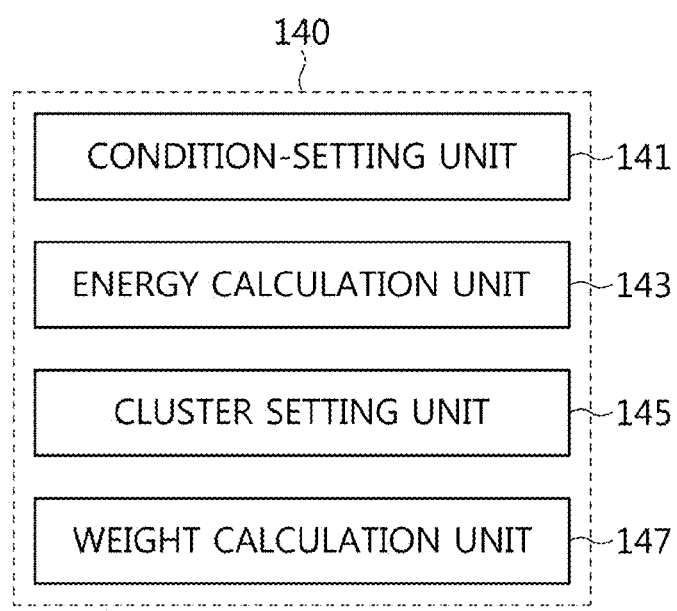
FIG. 2 is a view that shows the detailed configuration of the cluster optimization unit of FIG. 1.

Here, the cluster optimization unit 140 may have the components shown in FIG. 2.

Referring to FIG. 2, the cluster optimization unit 140 may include a condition-setting unit 141, an energy calculation unit 143, a cluster determination unit 145 and a weight calculation unit 147.

The condition-setting unit 141 selects a condition for a weight to be compared with a previously learning result in connection with the result of clustering, and sets a value for the selected condition. Here, the condition-setting unit 141 selects at least two conditions.

For example, the condition-setting unit 141 may select the similarity, the number of pixels included in each of the clusters, an RGB value, and the like, as the condition for the weight, but the condition is not limited to these examples.

When the condition for a weight is set by the condition-setting unit 141, the energy calculation unit 143 calculates an energy value based on the set condition. For example, the equation for calculating an energy value based on the similarity may be represented as the following Equation (1):

$$E_{1,k} = \frac{k}{k-1} \sum_{i} \sum_{j \in neighbor(i)} XOR(c_i, c_j) \quad (1)$$

where k denotes the number of clusters, $E_{1,k}$ denotes an energy function for the first cluster from among k clusters, i and j denote pixel values of the corresponding cluster, neighbor(i) denotes a set of pixels adjacent to the pixel i, $c_i$ denotes a cluster to which the pixel i is assigned, and $c_j$ denotes a cluster to which the pixel j is assigned. Also, XOR is an abbreviation of an exclusive-OR function, which outputs 0 when two input values are the same but outputs 1 when the two input values differ from each other.

The energy calculation unit 143 calculates k energy functions ($E_{1,k}$, $E_{2,k}$, . . . , $E_{k,k}$) based on Equation (1) and calculates a weighted sum for the k calculated energy values.

The cluster determination unit 145 takes 'k' as the number of clusters when the weighted sum for the k energy values, calculated by the energy calculation unit 143, becomes the minimum value.

When k is set as the number of clusters by the cluster determination unit 145, the weight calculation unit 147 optimizes a weight by comparing it with a learning result for the image having k clusters, selected from among the learning results stored in the storage unit 150.

That is, the weight calculation unit 147 serves to optimize a weight, and the optimization process performed by the weight calculation unit 147 may be divided into two phases.

First, the weight calculation unit 147 may perform rough optimization as the first optimization process.

Here, the ground truth for the number of clusters, which is acquired as the result of learning and stored in the storage unit 150, may not match the weight because the ground truth is located in the discrete space. Accordingly, in the first optimization process, the weight that best matches the ground truth in the pool on the arbitrarily set discrete space is calculated.

The method for calculating the weight in the first optimization process may be implemented as the following Equation (2):

$$\arg\max_{\overline{W}} \Sigma \text{XOR}(k_d(\overline{W}), K_{groundtruth}) \qquad (2)$$

where $k_d$ denotes the number of clusters, calculated using data by the cluster determination unit 145, and $k_{groundtruth}$ denotes the number of clusters in the ground truth stored in the storage unit 150.

The weight calculation unit 147 may calculate the weight that enables a matching value between two sets respectively for the calculated number of clusters and the number of clusters in the ground truth to become the maximum value, as shown in Equation (2).

Here, because the weight, calculated through the above-mentioned process, is defined as a set in the discrete space, it is merely an approximate value. Therefore, the weight calculation unit 147 performs the second optimization process on the result of the first optimization process.

In the second optimization process, the weight that makes the maximum difference when matching a result of the XOR function performed on k, which is the set number of clusters, with a result of the XOR function performed on k', which is another number of clusters, is calculated. The weight calculated through this process may have the optimum value as a value in a contiguous space.

Accordingly, the cluster determination unit 145 may determine the final number of clusters based on the weight optimized by the weight calculation unit 147. Here, the cluster determination unit 145 selects an image corresponding to the final number of clusters from among the results of clustering performed by the clustering unit 130 and outputs the selected image.

The storage unit 150 may store data and algorithms that are needed in order to operate the apparatus for processing a textured image.

For example, the storage unit 150 may store values set by the filter unit 110 and smoothing unit 120, the number of regions into which an image is to be segmented, and the number of times that clustering is to be performed, which are applied to the clustering unit 130. Also, the storage unit 150 may store images output from the filter unit 110, the smoothing unit 120, and the clustering unit 130.

Also, the storage unit 150 may store the algorithm that is used to optimize the weight in the cluster optimization unit 140 and an algorithm for setting the number of clusters based on the weight.

Here, the storage unit 150 may include at least one storage medium selected from among Random Access Memory (RAM), Static Random Access Memory (SRAM), Read-Only Memory (ROM), Programmable Read-Only Memory (PROM) and Electrically Erasable Programmable Read-Only Memory (EEPROM).

Figure 3:
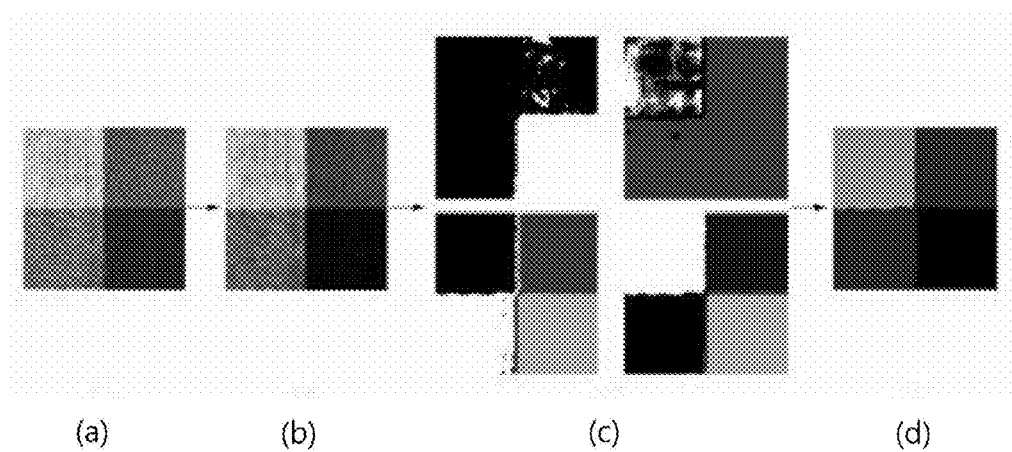
FIG. 3 is a view that shows an embodiment to be referred to when describing the operation of an apparatus for processing a textured image according to the present invention.

FIG. 3 is a view that shows an embodiment to be referred to in order to describe the operation of an apparatus for processing a textured image according to the present invention.

Referring to FIG. 3, (a) shows an input image that includes various kinds of textures. The input image of (a) may be transformed into the image of (b), in which the density of the edge is represented through filtering and smoothing.

Subsequently, the image of (b) may be transformed into a predetermined number of segmented images shown in (c) by clustering multiple times. Here, (c) shows an embodiment in which clustering is performed four times, but the number of times is not limited thereto.

Each of the images in (c) has a different number of clusters. The apparatus for processing a textured image performs image optimization on each of the images in (c) and thereby sets the number of clusters by selecting the number of clusters of any one of the images. Then, the image corresponding to the finally set number of clusters is selected from among the images in (c) and output as shown in (d).

As described above, the apparatus for processing a textured image according to the present invention enables the number of clusters optimized to a corresponding image to be quickly and accurately set for an image having various kinds of textures.

The flow of operations of the apparatus for processing a textured image according to the present invention, configured as described above, will be described below.

Figure 4:
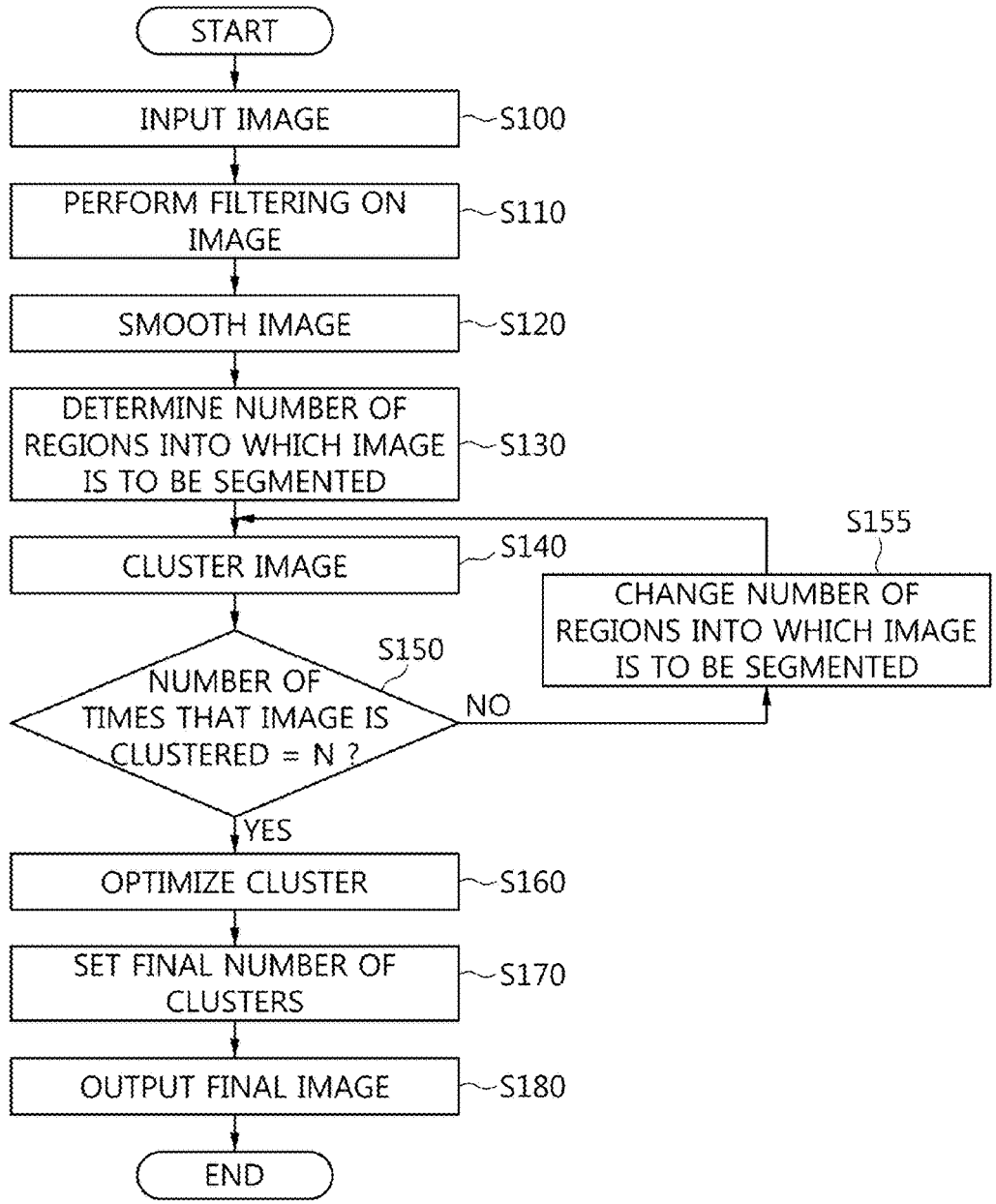
FIG. 4 and FIG. 5 are views that show a flowchart of a method for processing a textured image according to the present invention.
Figure 5:
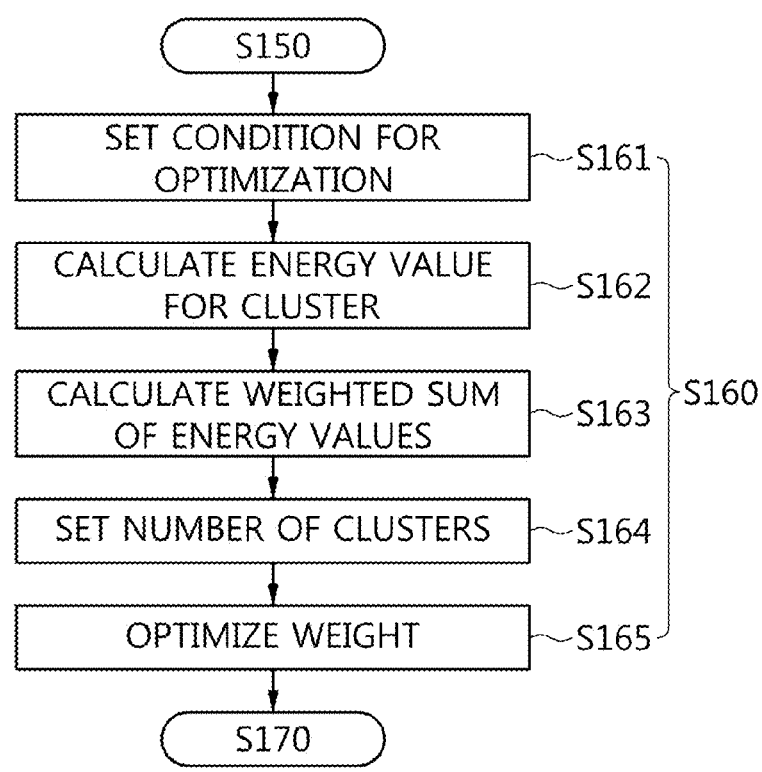

FIG. 4 and FIG. 5 are views that show a flowchart of a method for processing a textured image according to the present invention.

Referring to FIG. 4, when an image is input at step S100, the apparatus for processing a textured image filters the input image and thereby transforms the input image into an image in which the density of the edge is represented at step S110. Then, at step S120, the apparatus for processing a textured image performs smoothing on the image transformed at step S110.

Then, the apparatus for processing a textured image performs clustering on the image smoothed at step S120 depending on the number of regions into which the image is to be segmented, whereby the image is segmented at step S130. Here, clustering is performed a preset number of times (N), and the number of regions into which the image is to be segmented is changed whenever clustering is performed at steps S150 and S155.

When N times of image clustering is completed at step S150, the apparatus for processing a textured image performs cluster optimization on the results of clustering, which is performed N times, at step S160, and sets the final number of clusters at step S170 based on the result of cluster optimization of step S160.

Here, step S160 may be described as subdivided processes as shown in FIG. 5. As shown in FIG. 5, when performing clustering optimization, the apparatus for processing a textured image selects a condition for a weight to be compared with a previous learning result in connection with the clustering result, and sets the value of the selected condition at step S161. Then, at step S162, the apparatus for processing a textured image calculates an energy value for each of the clusters based on the condition set at step S161. As the equation for calculating the energy value for each of the clusters at step S162, Equation (1), which has been described above, may be used.

The apparatus for processing a textured image calculates the weighted sum of the energy values for the respective clusters at step S163, and sets k, which makes the weighted sum the minimum value, as the number of clusters at step S164.

Then, the apparatus for processing a textured image compares the ground truth for the number of clusters, previously learnt and stored, with the number of clusters set at step S164, and thereby optimizes a weight at step S165.

Accordingly, at step S170, the apparatus for processing a textured image may set the final number of clusters based on the weight optimized at step S165. At step S180, the apparatus for processing a textured image finally selects a resultant image corresponding to the final number of clusters, set at step S170, from among N clustering results acquired through processes of steps S140 to S155.

The apparatus for processing a textured image, operating as described above, may be implemented in the form of an independent hardware device, and may be implemented as at least one processor included in another hardware device such as a microprocessor or a general computer system.

Figure 6:
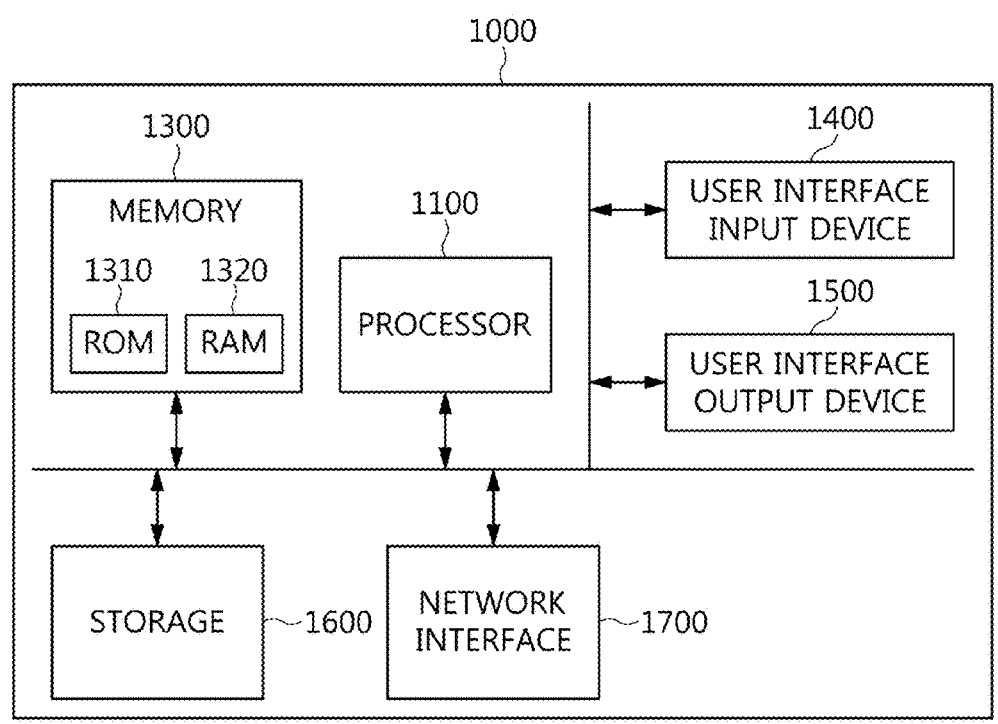
FIG. 6 is a view that shows the configuration of a computing system to which the apparatus according to the present invention is applied.

FIG. 6 is a view that shows a computing system to which the apparatus according to the present invention is applied.

Referring to FIG. 6, the computing system 1000 may include at least one processor 1100, memory 1300, a user interface input device 1400, a user interface output device 1500, storage 1600, and a network interface 1700, which are connected with each other via a bus 1200.

The processor 1100 may be a central processing unit (CPU) or a semiconductor device for processing instructions stored in the memory 1300 and/or the storage 1600. The memory 1300 and the storage 1600 may include various kinds of volatile or nonvolatile storage media. For example, the memory 1300 may include Read-Only Memory (ROM) and Random Access Memory (RAM).

Accordingly, the step of performing the method or the step of executing the algorithm that has been described in connection with the embodiments disclosed in the present specification may be implemented as hardware, a software module or a combination thereof, which is executed by the processor 1100. The software module may be stored in the storage media, such as RAM, flash memory, ROM, EPROM, EEPROM, a register, a hard disk, a removable disk, or CD-ROM, that is, in the memory 1300 and/or the storage 1600. The exemplary storage media are coupled to the processor 1100, and the processor 1100 may read and interpret information stored in the storage media and write information thereto. In another example, the storage media may be integrated with the processor 1100. The processor integrated with the storage media may be stored in an Application-Specific Integrated Circuit (ASIC). The ASIC may be stored in a user terminal. In other examples, the processor and storage media may be stored in a user terminal as separate components.

According to the present invention, when segmentation of a textured image is performed, because the number of clusters of the textured image is quickly and accurately set, it is advantageous in that segmentation may be performed using a number of clusters that is optimized to the corresponding textured image.

The above description merely illustrates the technical spirit of the present invention, and those skilled in the art may make various changes and modifications without departing from the scope of the present invention.

Accordingly, the embodiments, having been disclosed in the present invention, are intended not to limit but to describe the technical spirit of the present invention, and the scope of the technical spirit of the present invention is not limited to the embodiments. The scope of protection of the present invention must be interpreted based on the accompanying claims, and all the technical spirit in the same range as the claims must be interpreted as being included in the scope of rights of the present invention.

What is claimed is:

1. A non-transitory computer readable medium with executable instructions stored thereon which, when executed by a processor, perform the following operations:
   detecting an edge of an input image and transforming the input image into an image in which a density of the edge is represented using information about the detected edge;
   removing noise from the transformed image and then smoothing the transformed image;
   performing, a preset number of times, changing a number of regions into which the smoothed image is to be segmented and clustering the smoothed image;
   determining a final number of clusters for the input image by optimizing a number of clusters for the input image based on a previously learned ground truth; and
   selecting a resultant image corresponding to the final number of clusters from among results of clustering performed the preset number of times and outputting the selected resultant image.

2. The non-transitory computer readable medium of claim 1, wherein the operation of determining the final number of clusters comprises:
   determining the number of clusters based on an energy value for each of clusters of the image segmented as a result of clustering; and
   optimizing a weight corresponding to the determined number of clusters.

3. The non-transitory computer readable medium of claim 2, wherein the operation of determining the number of clusters comprises:
   determining the number of clusters comprises:
   setting a condition for a weight and calculating an energy value for each of the clusters depending on the set condition;
   calculating a weighted sum of the energy values of the respective clusters; and
   setting the number of clusters to a value that enables the weighted sum of the energy values to become a minimum value.

4. The non-transitory computer readable medium of claim 2, wherein the operation of optimizing the weight comprises comparing the determined number of clusters with the number of clusters in the previously learned ground truth.

5. The non-transitory computer readable medium of claim 4, wherein the operation of optimizing the weight comprises calculating the weight so as to maximize a matching value between the determined number of clusters and the number of clusters in the previously learned ground truth.

6. The non-transitory computer readable medium of claim 4, wherein the operation of optimizing the weight further comprises performing a matching between an XOR function value for the determined number of clusters and an XOR function value for another number of clusters which is arbitrarily selected, and calculating the weight so as to maximize a difference of the matching.

7. The non-transitory computer readable medium of claim 2, wherein determining the final number of clusters further comprises setting the final number of clusters based on the optimized weight.

8. A method for processing a textured image, comprising:
- detecting an edge of an input image and transforming the input image into an image in which a density of the edge is represented using information about the detected edge;
- removing noise from the transformed image and then smoothing the transformed image;
- performing, a preset number of times, changing a number of regions into which the smoothed image is to be segmented and clustering the smoothed image;
- determining a final number of clusters for the input image by optimizing a number of clusters for the input image based on a previously learned ground truth; and
- selecting a resultant image corresponding to the final number of clusters from among results of clustering performed the preset number of times and outputting the selected resultant image.

9. The method of claim 8, wherein determining the final number of clusters comprises:
- determining the number of clusters based on an energy value for each of clusters of the image segmented as a result of clustering; and
- optimizing a weight corresponding to the determined number of clusters.

10. The method of claim 9, wherein determining the number of clusters comprises:
- setting a condition for a weight and calculating an energy value for each of the clusters depending on the set condition;
- calculating a weighted sum of the energy values of the respective clusters; and
- setting the number of clusters to a value that enables the weighted sum of the energy values to become a minimum value.

11. The method of claim 9, wherein optimizing the weight comprises calculating the weight so as to maximize a matching value between the determined number of clusters and the number of clusters in the previously learned ground truth.

12. The method of claim 11, wherein optimizing the weight further comprises performing a matching between an XOR function value for the determined number of clusters and an XOR function value for another number of clusters which is arbitrarily selected, and calculating the weight so as to maximize a difference of the matching.

13. The method of claim 9, wherein determining the final number of clusters further comprises setting the final number of clusters based on the optimized weight.

* * * * *